(12) United States Patent
Harada et al.

(10) Patent No.: US 11,133,918 B2
(45) Date of Patent: Sep. 28, 2021

(54) TERMINAL AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/782,696

(22) Filed: Feb. 5, 2020

(65) Prior Publication Data

US 2020/0177359 A1 Jun. 4, 2020

Related U.S. Application Data

(63) Continuation of application No. 15/755,831, filed as application No. PCT/JP2016/074955 on Aug. 26, 2016, now abandoned.

(30) Foreign Application Priority Data

Sep. 1, 2015 (JP) .................................. 2015-172358

(51) Int. Cl.
*H04L 5/18* (2006.01)
*H04L 27/26* (2006.01)
*H04L 1/16* (2006.01)
*H04L 5/14* (2006.01)
(Continued)

(52) U.S. Cl.
CPC .............. *H04L 5/18* (2013.01); *H04L 1/1664* (2013.01); *H04L 5/1469* (2013.01); *H04L 5/16* (2013.01);
(Continued)

(58) Field of Classification Search
CPC ... H04L 5/0044; H04L 5/0053; H04L 5/1469; H04L 5/16; H04L 5/18; H04L 5/22;
(Continued)

(56) References Cited

U.S. PATENT DOCUMENTS 7,979,022 B2    7/2011    Cho et al.
8,532,049 B2    9/2013    Higuchi et al.
(Continued)

FOREIGN PATENT DOCUMENTS

JP    2008-053864 A    3/2008
JP    2008-507192 A    3/2008
WO    2016/196036 A1    12/2016

OTHER PUBLICATIONS

Office Action in counterpart Japanese Patent Application No. 2017-537832 dated Jun. 9, 2020 (8 pages).
(Continued)

*Primary Examiner* — Paul H Masur
(74) *Attorney, Agent, or Firm* — Osha Bergman Watanabe & Burton LLP

(57) ABSTRACT

A terminal is disclosed that includes a receiver that receives downlink control information used for scheduling a physical shared channel and a processor that determines a symbol section that is allocated to the physical shared channel by using information, included in the downlink control information, regarding a resource to be allocated. In other aspects, a radio communication method for a terminal is disclosed.

5 Claims, 12 Drawing Sheets

(51) Int. Cl.
  *H04L 5/16*  (2006.01)
  *H04L 5/22*  (2006.01)
  *H04W 72/04*  (2009.01)
  *H04L 1/18*  (2006.01)
  *H04L 5/00*  (2006.01)

(52) U.S. Cl.
  CPC ............ *H04L 5/22* (2013.01); *H04L 27/2602* (2013.01); *H04L 27/2607* (2013.01); *H04L 1/1812* (2013.01); *H04L 1/1854* (2013.01); *H04L 5/0044* (2013.01); *H04L 5/0053* (2013.01); *H04W 72/04* (2013.01)

(58) Field of Classification Search
  CPC ... H04L 1/1664; H04L 1/1812; H04L 1/1854; H04L 27/2602; H04L 27/2607; H04W 72/04; H04W 72/0406
  See application file for complete search history.

(56) References Cited

U.S. PATENT DOCUMENTS

| | | | | |
|---|---|---|---|---|
| 2014/0044084 | A1* | 2/2014 | Lee | H04W 72/042 370/329 |
| 2015/0358124 | A1* | 12/2015 | Suzuki | H04L 5/0053 370/329 |
| 2016/0119920 | A1 | 4/2016 | Mallik et al. | |
| 2016/0234830 | A1* | 8/2016 | Kim | H04L 1/1887 |
| 2016/0249329 | A1 | 8/2016 | Au et al. | |
| 2016/0337086 | A1* | 11/2016 | Shen | H04W 4/70 |
| 2016/0353436 | A1 | 12/2016 | Au et al. | |
| 2018/0007673 | A1 | 1/2018 | Fwu et al. | |
| 2018/0026714 | A1 | 1/2018 | Miao et al. | |
| 2018/0176912 | A1 | 6/2018 | Li et al. | |
| 2018/0205534 | A1 | 7/2018 | Yi | |
| 2019/0007956 | A1 | 1/2019 | Jiang et al. | |

OTHER PUBLICATIONS

International Search Report of the International Searching Authority issued in PCT/JP2016/074955 dated Nov. 15, 2016 (2 pages).

Witten Opinion of the International Searching Authority issued in PCT/JP2016/074955 dated Nov. 15, 2016 (4 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

TERMINAL AND RADIO COMMUNICATION METHOD

CROSS-REFERENCE TO RELATED APPLICATIONS

The present application is a continuation application and, thereby claims benefit under 35 U.S.C. § 120 to U.S. patent application Ser. No. 15/755,831, filed on Feb. 27, 2018, titled, "USER TERMINAL, RADIO BASE STATION AND RADIO COMMUNICATION METHOD," which is a national stage application of PCT Application No. PCT/JP2016/074955, filed on Aug. 26, 2016, which claims priority to Japanese Patent Application No. 2015-172358, filed on Sep. 1, 2015. The contents of these applications are hereby incorporated by reference in their entirety.

TECHNICAL FIELD

The present invention relates to a user terminal, a radio base station and a radio communication method in a next-generation communication system.

BACKGROUND ART

In a UMTS (Universal Mobile Telecommunications System) network, for the purposes of achieving higher-speed data rates, providing low delay and so on, long-term evolution (LTE) has been standardized (see Non-Patent Literature 1). For the purposes of achieving further broadbandization and higher speed beyond LTE, successor systems to LTE have been also studied a (for example, such a system is known as LTE-A (LTE advanced), FRA (Future Radio Access), and 5G ($5^{th}$ Generation Mobile Communication System), etc.)

In future radio communication systems (e.g., 5G), due to their use for mobile broadband, it is assumed that there will be a demand for further increases in speed and volume, while being required to reduce delay and deal with the connecting of a large volume of devices. Furthermore, in order to achieve a further increase in speed and volume, it is also envisaged that an even broader bandwidth of the frequency spectrum will be utilized.

In order to meet this demand, it is expected in future radio communication systems to introduce a new radio access scheme (5G New RAT) in addition to the radio access scheme of a legacy LTE system (LTE RAT: Radio Access Technology).

CITATION LIST

Non Patent Literature

Non-Patent Literature 1: 3GPP TS 36.300 Rel.8 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

In future radio communication systems, it is assumed that there will be a demand for increase in usage efficiency of radio resources flexibly in accordance with fluctuations in traffic between downlink (DL) and uplink (UL) and for reduction in delay. Accordingly, in the new radio access scheme (5G New RAT), it is required to switch between DL and UL in Time Division Duplex (TDD) where DL and UL are time-division-multiplexed in the same frequency domain (carrier), dynamically per transmission time interval (TTI).

However, when switch between DL and UL in TDD is allowed per TTI, there may not be sufficient reduction of delay.

The present invention was carried out in view of the foregoing and aims to provide a user terminal, a radio base station and a radio communication method capable of achieving further reduction of delay in a radio communication system in which DL and UL are switchable per TTI in TDD.

Solution to Problem

The present invention provides a user terminal used in a radio communication system in which downlink (DL) and uplink (UL) are switchable per transmission time interval (TTI), the user terminal comprising: a reception section that receives a DL signal in a DL TTI; and a transmission section that transmits a UL signal in a UL TTI, wherein the DL TTI and the UL TTI are different in TTI length.

Advantageous Effects of Invention

According to the present invention, it is possible to achieve further reduction of delay in a radio communication system in which DL and UL are switchable per TTI in TDD

DESCRIPTION OF EMBODIMENTS

Figure 1A:
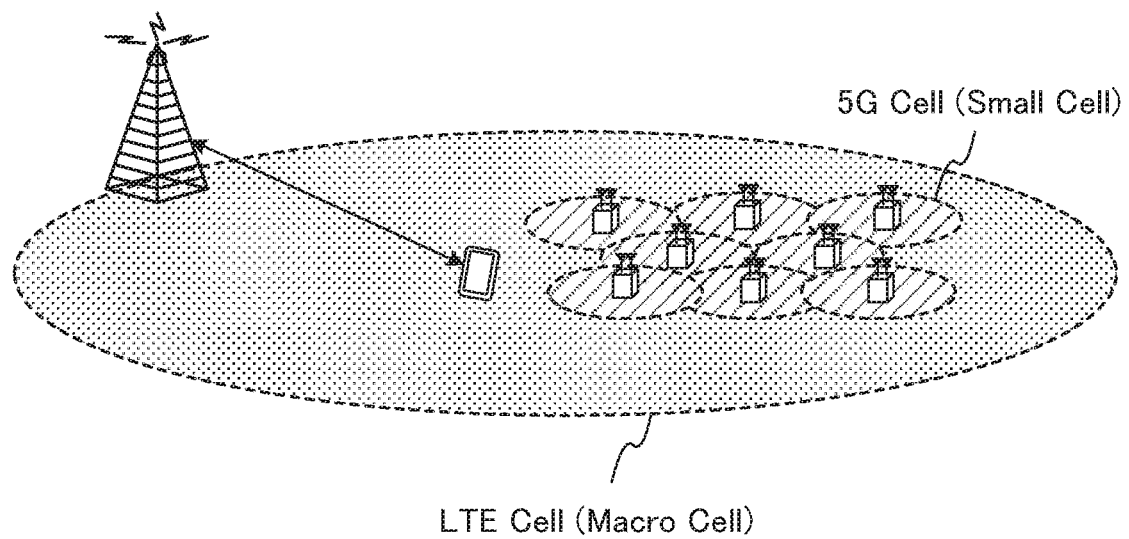
FIGS. 1A and 1B are diagrams illustrating an example of introduction of a future radio communication system.
Figure 1B:
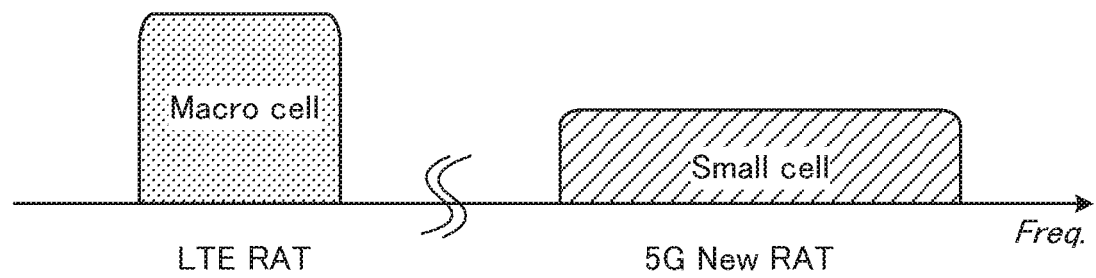

FIGS. 1A and 1B provide diagrams illustrating an example of introduction of a future radio communication system. As illustrated in FIG. 1A, the future radio communication system such as 5G is expected to be introduced as overlaying an existing LTE system.

For example, in FIG. 1A, a plurality of cells (5G cells) of a radio access scheme of the future radio communication system (5G New RA) are located within a cell (LTE cell) of a radio access scheme of the existing LTE system (LTE RAT). As illustrated in FIG. 1A, it may be configured that the LTE cell is a macro cell having a relatively large coverage and the 5G is a small cell having a smaller coverage than the LTE cell.

In addition, as illustrated in FIG. 1B, 5G New RAT cell (for example, small cell) is expected to use a higher frequency band than the LTE RAT cell (for example, macro cell).

Figure 2A:
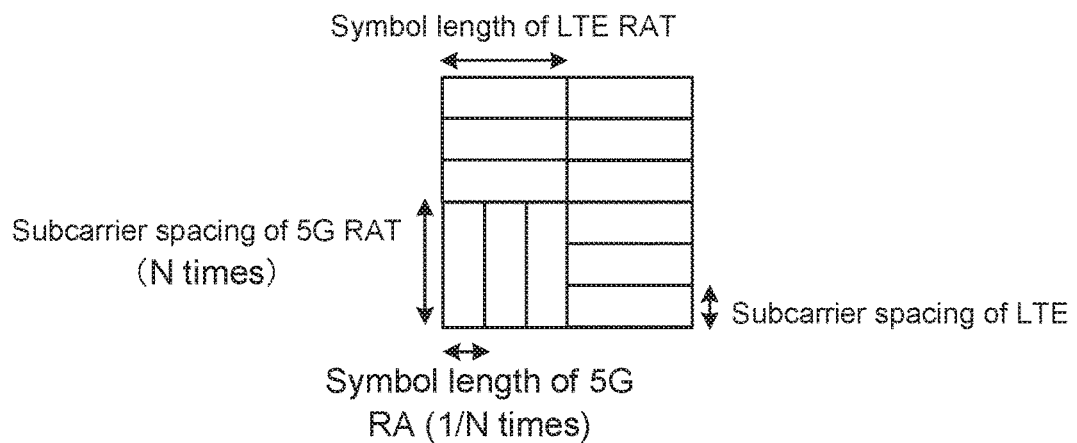
FIGS. 2A and 2B are diagrams illustrating an example of 5G New RAT.
Figure 2B:
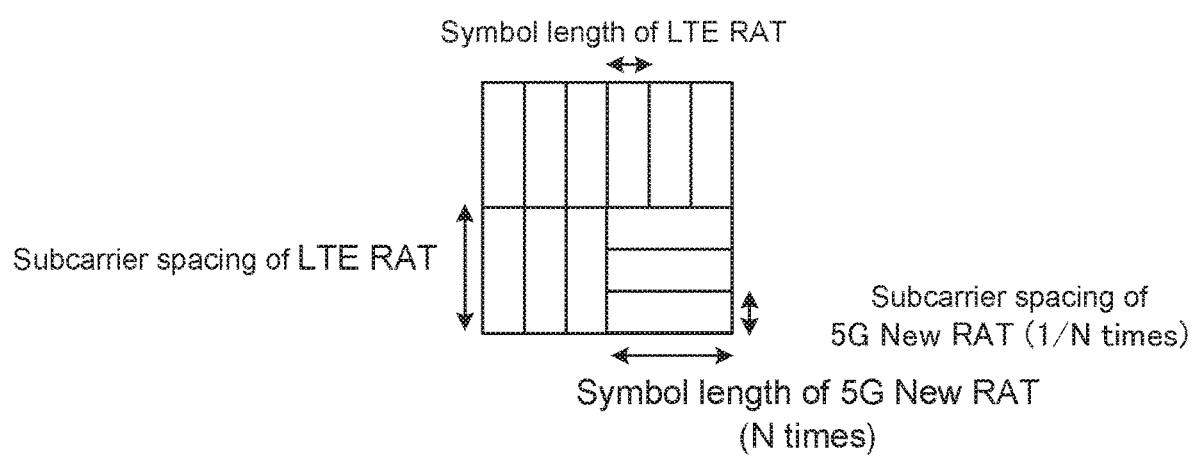

FIGS. 2A and 2B provide diagrams illustrating an example of 5G New RAT. As illustrated in FIG. 2A, in 5G New RAT, it is assumed that a frequency parameter (for example, subcarrier spacing, bandwidth, etc.) is N times as long as that of LTE RAT and the time parameter (for example, symbol length) is 1/N times as long as that of LTE RAT. In this case, the TTI consisting of a plurality of symbols becomes shorter than that of LTE RAT, 1 ms, which makes it possible to realize reduction in delay easily.

Otherwise, in 5G New RAT, it may be also assumed that the frequency parameter (for example, subcarrier spacing, bandwidth, etc.) is 1/N time greater than that of LTE RAT and the time parameter (for example, symbol length) is N time greater than that of LTE RAT. In this case, the symbol length becomes longer, which makes it possible to improve fading tolerance (be robust against fading).

In such 5G new RAT, there is a demand to improve the usage efficiency of radio resources flexibly in accordance with fluctuations in traffic between DL and UL and provide lower delay. Therefore, in 5G New RAT, it is required in TDD to switch between DL and UL per TTI dynamically.

However, if DL and UL are changeable in TDD per TTI, sufficient reduction of delay may not be achieved. Specifically, in a future radio communication system, DL traffic is expected to be drastically greater than UL traffic. Accordingly, in the UL TTI, there is a risk that a part of resources is used and the remaining part is unused. On the other hand, unused resources in DL TTI may cause an increase in overhead, which prevents reduction of the delay.

Then, the present inventors have found that the UL TTI and DL TTI are applied with different TTI lengths thereby to reduce overhead and realize further reduction of the delay and have completed the present invention.

According to an embodiment of the present invention, in a radio communication system in which switch between DL and UL is allowed per TTI, a user terminal receives a DL signal in a DL TTI and transmits a UL signal in a UL TTI. In addition, the DL TTI and UL TTI are applied with mutually different TTI lengths.

The following description is made about a radio communication method according to the embodiment of the present invention. In the following description, it is assumed that the UL TTI length is shorter than the DL TTI length, but this is not intended to limit the present invention. In the present embodiment, the DL TTI length may be shorter than the UL TTI length, as far as the UL TTI length and the DL TTI length are different from each other.

First Embodiment

In the first embodiment, description is made of mutually different UL TTI length and DL TTI length.

Figure 3:
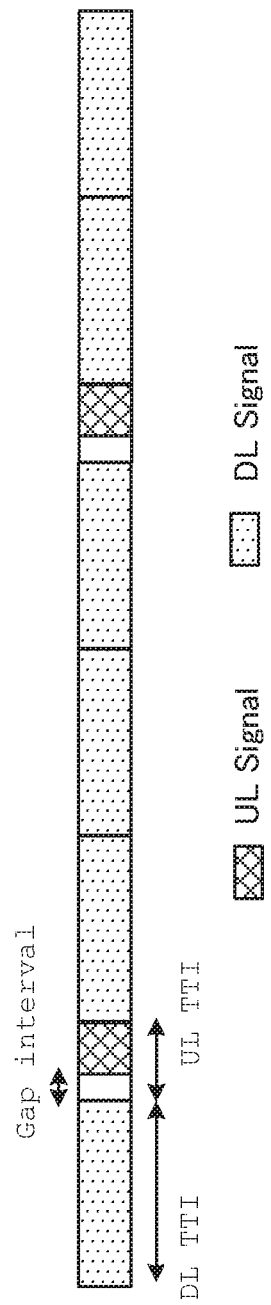
FIG. 3 is an example illustrating an example of UL TTI length and DL TTI length according to a first embodiment.

FIG. 3 is a diagram illustrating an example of the UL TTI length and the DL TTI length according to the first embodiment. As illustrated in FIG. 3, the DL TTI and the UL TTI are applied with different TTI lengths. Specifically, the UL TTL length may be shorter than the DL TTI length. Besides, the UL TTI may be configured including a gap interval used for timing advance and/or switch between transmission and reception and a symbol interval to allocate a UL signal.

For example, in FIG. 3, the UL TTI length may be 1/N times as long as the DL TTI length (N is a positive integer). With this length, when long-term DL-dedicated TTI is configured, a UL TTI is included between long-term DL-dedicated TTIs thereby to prevent timing difference of the DL-dedicated TTI. Note that when the UL TTI length is 1/N as long as the DL TTI length, the UL subcarrier spacing may be N times as long as the DL subcarrier spacing (N is a positive integer).

Figure 4A:
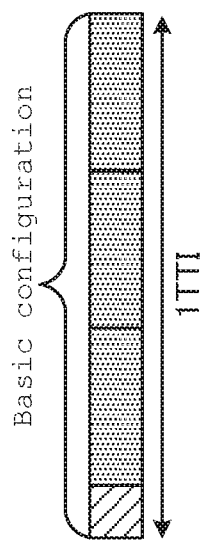
FIGS. 4A, 4B and 4C are diagrams illustrating another example of another example of UL TTI length and DL TTI length according to the first embodiment.
Figure 4B:
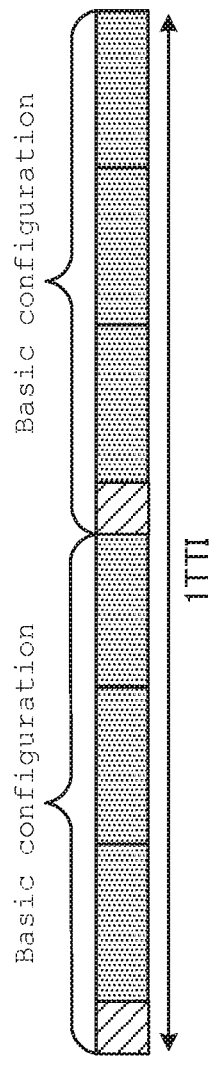
Figure 4C:
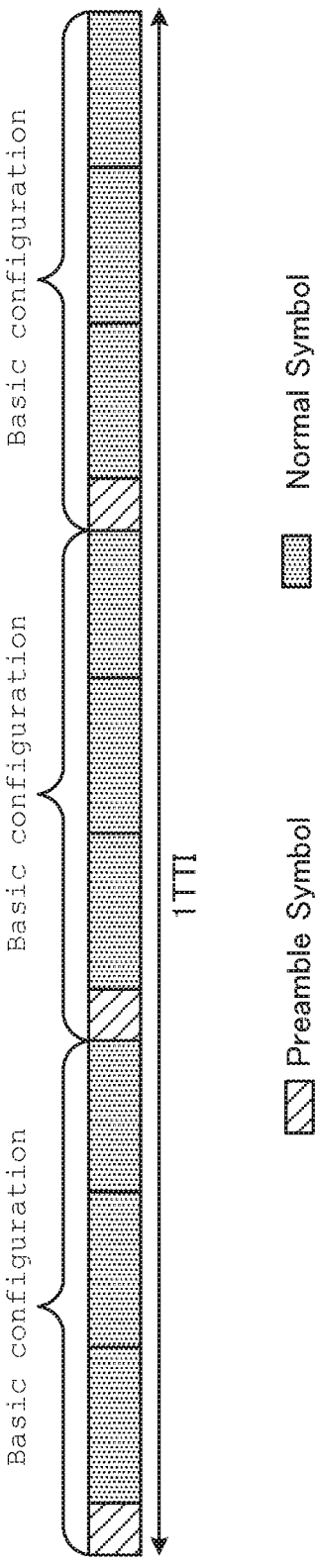

FIGS. 4A, 4B, and 4C provide diagrams illustrating other examples of UL TTI length and DL TTI length according to the first embodiment. As illustrated in FIG. 4A, the UL TTI length and DL TTI length may be configured based on the basic configuration including at least one symbol to allocate a preamble (preamble symbol) and at least one symbol to allocate a data channel or/and a control channel (normal symbol).

For example, in FIG. 4A, the basic configuration may be configured to include one preamble symbol and a plurality of normal symbols. Further, the preamble symbol may be different in at least one of the subcarrier spacing, symbol length and CP length from the normal symbol. In FIG. 4A, the symbol length of the preamble is shorter than the symbol length of the normal symbol. In addition, in the basic configuration, the preamble symbol may be allocated at the top.

As illustrated in FIG. 4A, one TTI may be configured only of the basic configuration (that is, by repeating the basic configuration once). Or, as illustrated in FIG. 4B, one TTI may be configured by repeating the basic configuration twice. Otherwise, as illustrated in FIG. 4C, one TTI may be configured by repeating the basic configuration three times. In this way, one TTI is configured of the N times of the basic configuration (N is a positive integer).

When one TTI is configured of N times of the basic configuration (N is a positive integer), the DL TTI length may be differentiated from the UL TTI length by changing the number of repetitions of the basic configuration between the DL TTI and the UL TTI. For example, for the UL TTI, the number of repetitions of the basic configuration is one (FIG. 4A), and for the DL TTI, the number of repetitions of the basic configuration is three (FIG. 4C). With this process, the UL TTI length becomes ⅓ greater than the DL TTI length.

Thus, if the DL TTI length and the UL TTI length are adjusted by changing the number of repetitions of the basic configuration, the UL TTI length is easily set to 1/N times as long as the DL TTI length (N is a positive integer).

In addition, the user terminal may receive information about a ratio (N) between UL TTI length and DL TTI length from the radio base station (network). The information about the ratio may be provided from the radio base station to the use terminal by higher layer signaling (for example, RRC (Radio Resource Control) signaling), broadcast information, or the like. The user terminal controls UL signal transmission in the UL TTI and DL signal reception in DL TTI based on the ratio between the UL TTI length and the DL TTI length.

Note that the basic configuration illustrated in FIG. 4A is not provided for illustrative purpose only and is not intended to limit the present invention. For example, in FIGS. 4A, 4B, and 4C, a preamble symbol is included in the basis configuration, but may not be included therein. Further, the symbol length of the preamble symbol may be the same as the symbol length of the normal symbol.

In addition, the DL and/or UL TTI length may be changed dynamically. Specifically, the DL and/or UL TTI length as shown in FIG. 3 may be designated by downlink control information (DCI) transmitted in a control channel (for example, DL assignment or UL grant). Besides, as explained with reference to FIGS. 4A, 4B, and 4C, when DL and/or UL TTI is configured by repeating the basic configuration, the DCI may include information indicating the number of repetitions of the basic configuration. With this process, when the DL TTI length is differentiated from the UL TTI length, it is possible to improve the usage efficiency of radio resources.

The gap interval included in the UL TTI may be provided by replacing a part of symbols included in the basis configuration. For example, the TTI lengths as shown in FIGS. 4A, 4B and 4C are used for UL, a gap interval is located at the top in the length corresponding to the part of symbols, and preamble or normal symbols contained in the UL transmission signal may be reduced by the length of the gap interval.

According to the first embodiment, it is possible to apply different TTI lengths to the UL TTI and DL TTI, thereby enabling application of the TTI length in accordance with The UL/DL traffic. Consequently, it is possible to reduce the overhead due to unused resources in TTI and thereby to realize further reduction of the delay.

Second Embodiment

In the second embodiment, description is made of the operation of determining whether the TTI is DL TTI or not by the user terminal, when the UL TTI and DL TTI have different TTI lengths. The second embodiment may be implemented in combination with the first embodiment.

Figure 5:
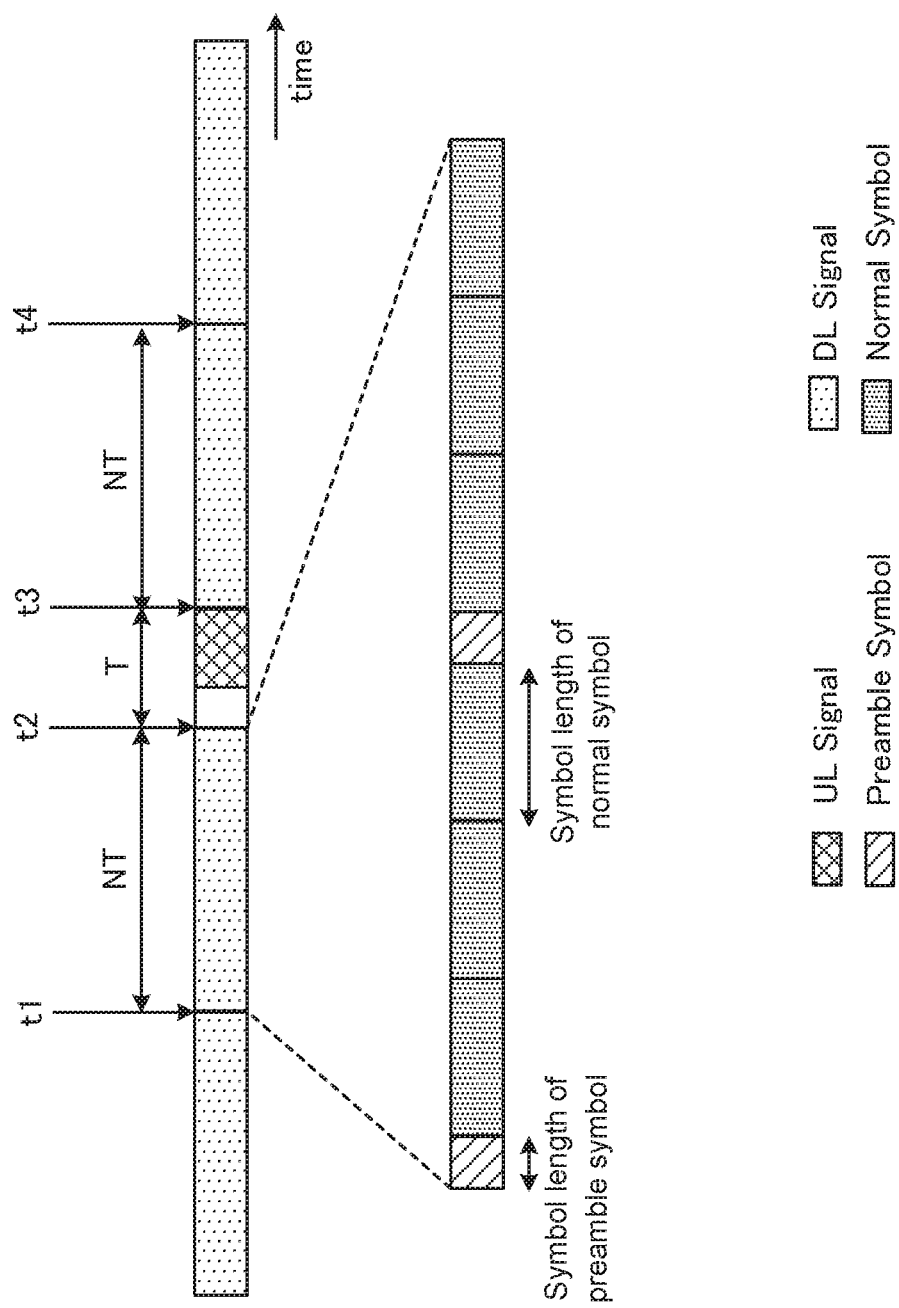
FIG. 5 is a diagram illustrating an example of the operation of determining (recognizing) a TTI in a user terminal according to a second embodiment.

FIG. 5 is a diagram illustrating an example of the TTI determining (recognizing) operation in the user terminal according to the second embodiment. In FIG. 5, the TTI length of UL TTI including a gap interval is T and the TTL length of DL TTI is NT. In addition, in FIG. 5, it is assumed that the DL TTI is configured by repeating the above-mentioned basic configuration twice, but this is not intended to limit the present invention. The DL TTI may be configured irrespective of the above-mentioned basic configuration, as long as it is different in TTI length from the UL TTI.

The user terminal controls the timing of determining whether each TTI is DL TTI or not based on the TTI length. For example, when a TTI starting at the timing t1 is determined to be DL TTI by detection of a preamble, the user terminal determines whether next TTI is DL TTI or not an NT period (DL TTI length) after the timing t1.

On the other hand, when TTI starting at the timing t2 is determined to be UL TTI due to no detection of a preamble, the user terminal determines whether next TTI is DL TTI or not a T period (UL TTI length) after the timing t2.

Further, as for TTI starting at the timing t3 in FIG. 5, it is determined to be DL TTI like the TTI starting at the timing t1 and therefore, the use terminal determines whether next TTI is DL TTI or not an NT period after the timing t3.

According to the second embodiment, even when the UL TTI and DL TTI have different TTI lengths, the user terminal is able to determine whether the TTI is DL TTI or UL TTI appropriately.

Third Embodiment

In the third embodiment, description is made about a symbol for a feedback signal (feedback symbol) included in DL TTI. The third embodiment may be implemented in combination with the first and/or second embodiment.

In the third embodiment, the DL TTI includes a feedback symbol for transmitting a feedback signal in response to a DL signal. This feedback signal is, for example, a signal including transmission acknowledgement information (HARQ-ACK: Hybrid Automatic Repeat request-ACKnowledgement) for the DL signal.

Figure 6:
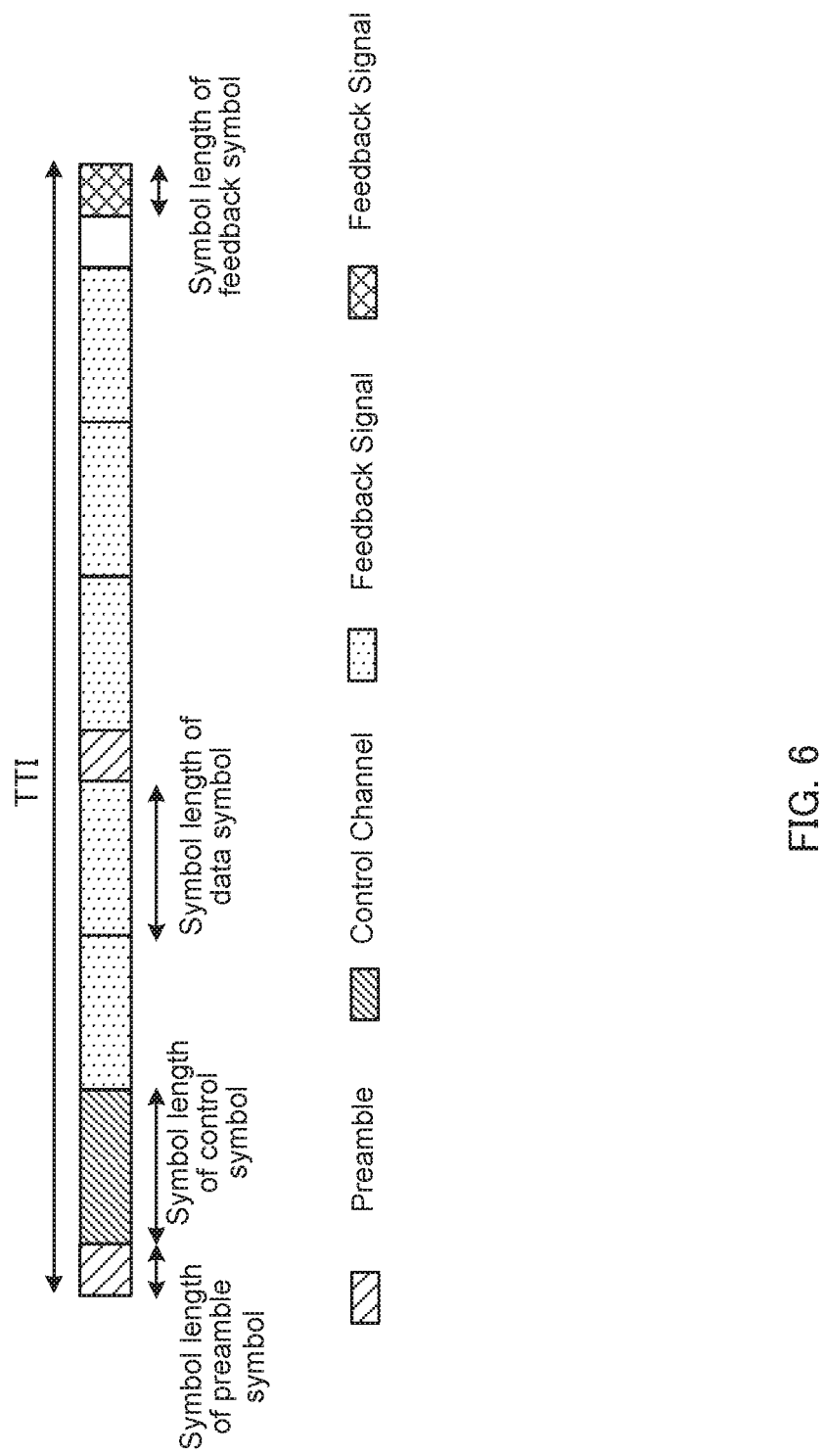
FIG. 6 is a diagram illustrating an example of DL TTI according to a third embodiment.

FIG. 6 is a diagram illustrating an example of DL TTI according to the third embodiment. In FIG. 6, it is assumed that the DL TTI is configured by repeating the above-mentioned basic configuration twice, but this is not intended to limit the present invention. The DL TTI may be configured irrespective of the above-mentioned basic configuration, as far as the DL TTI is different in TTI length from the UL TTI.

As illustrated in FIG. 6, the DL TTI includes a feedback symbol in addition to a preamble symbol, a symbol (control symbol) to allocate a control channel (DL control signal) and a symbol (data symbol) to allocate a data channel (DL data signal). In addition, between the data symbol and the feedback symbol, a gap interval is provided to switch between DL and UL.

The feedback symbol may be different in at least any of the symbol length, subcarrier spacing and cyclic prefix (CP) length from the data symbol and/or the control symbol. For example, in FIG. 6, the symbol length of the feedback symbol is shorter than the symbol lengths of the data symbol and the control symbol.

Further, as illustrated in FIG. 6, the feedback symbol may be located at the last of TTI. With this configuration, the feedback signal for a data channel (DL data signal) received in the same TTI can be transmitted in the feedback symbol more easily.

Figure 7:
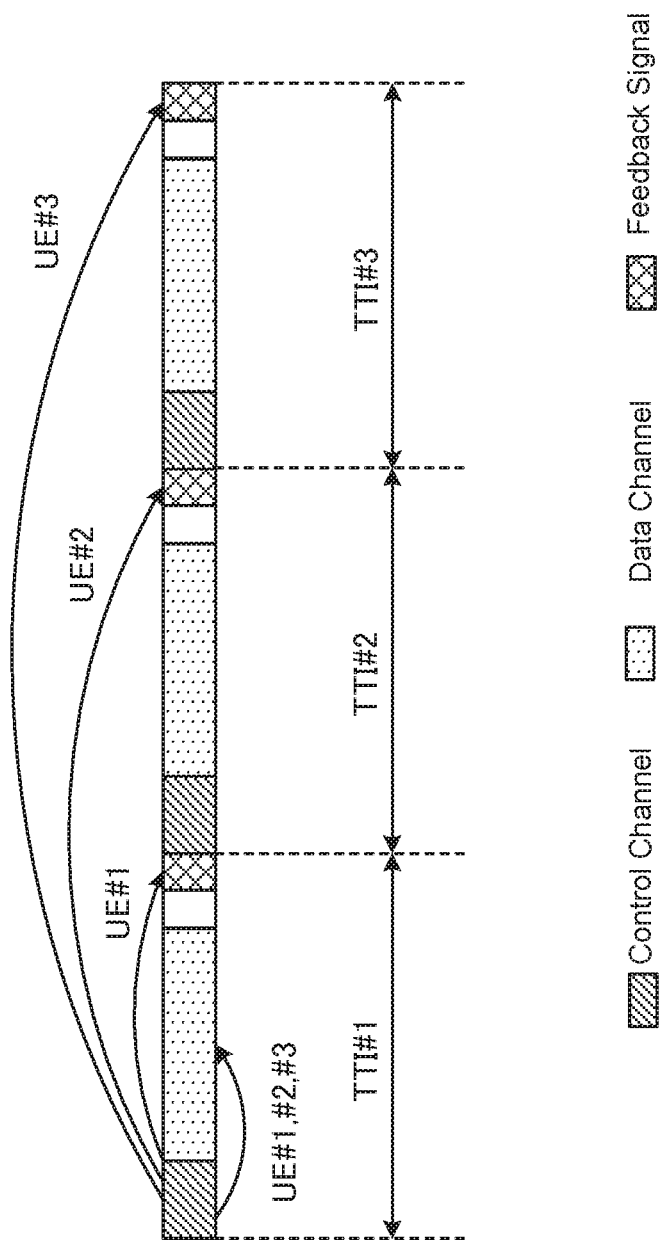
FIG. 7 is a diagram illustrating an example of the feedback operation using DL TTI according to the third embodiment.

FIG. 7 is a diagram illustrating an example of the feedback operation using DL TTI according to the third embodiment. In FIG. 7, illustration of the preamble symbol is omitted, but, the preamble symbol may be included in each TTI as explained in FIG. 6. In addition, in FIG. 7, illustration of the data symbol is omitted, but the data channel may be located in multiple symbols as illustrated in FIG. 6.

For example, in FIG. 7, the downlink control channel (DL control signal) of DL TTI #1 is used to allocate a data channel (DL data signal) in TTI #1 to the user terminals #1, #2 and #3. The user terminal #1 transmits a feedback signal for the data channel in TTI #1 by using a feedback symbol in the same TTI #1. On the other hand, the user terminal #2 transmits a feedback signal for the data channel in TTI #1 by using a feedback symbol in the next TTI #2. The user terminal #3 transmits a feedback signal for the data channel in TTI #1 by using a feedback symbol in TTI #3.

Thus, in the third embodiment, the use terminal transmits a feedback signal for a DL signal received in DL TTI by using a feedback symbol in the DL TTI or a feedback symbol in the next or later DL TTI.

In addition, the user terminal may receive downlink control information (DCI) indicating both of an allocation resource of a data channel and an allocation resource of a feedback signal for the data channel (for example, DL assignment) by a control channel. The user terminal may determine a feedback symbol based on the DCI and transmit a feedback signal using the determined feedback symbol.

Here, the user terminal may provide in advance the radio base station with interval information indicating a time interval required for transmitting a feedback signal in response to a data channel (for example, the above-mentioned T (UL TTI length), NT (DL TTI length=integral multiple of the UL TTI length) or the numbers of UL TTIs and DL TTIs) as capability information of the user terminal (UE capability). The radio base station may determine an allocation resource of a feedback signal based on the interval information from the user terminal.

With this process, the radio base station is able to allocate a feedback symbol in the same TTI as the data channel to the user terminal of high performance (for example, UE #1 in FIG. 7). On the other hand, the radio base station is able to allocate a feedback symbol in a next or later TTI to the TTI to which the data channel is allocated to the user terminals of low performance (for example, UE #2, UE #3 in FIG. 7).

Otherwise, the user terminal may receive DCI indicating an allocation resource of a data channel by the downlink control channel and may not receive information explicitly indicating an allocation resource of a feedback signal for the data channel. In this case, the user terminal may determine the allocation resource of the feedback signal based on information provided by higher layer signaling or capability information of the user terminal.

In the third embodiment, the user terminal is able to transmit a feedback signal for a data channel allocated in a DL TTI by using a feedback symbol in the same TTI in the shortest. Accordingly, there is no need to change the DL TTI to the UL TTI so as to transmit a feedback signal for the data channel, thereby realizing further reduction of delay.

Up to this point, description has been made of the feedback symbol included in the DL TTI, but it is also applicable to the UL TTI. Specifically, the UL TTI may be configured to include a data symbol and a feedback symbol. In this case, the radio base station transmits, to the user terminal, a feedback signal for a UL signal received in the UL TTI by using a feedback symbol in the UL TTI or a feedback symbol in the next or later UL TTI.

(Radio Communication System)

The following description concerns the configuration of a radio communication system according to an embodiment of the present invention. In this radio communication system, a radio communication method is adopted to which the above-described examples are applied. Furthermore, each communication method can be applied independently, or in combination.

Figure 8:
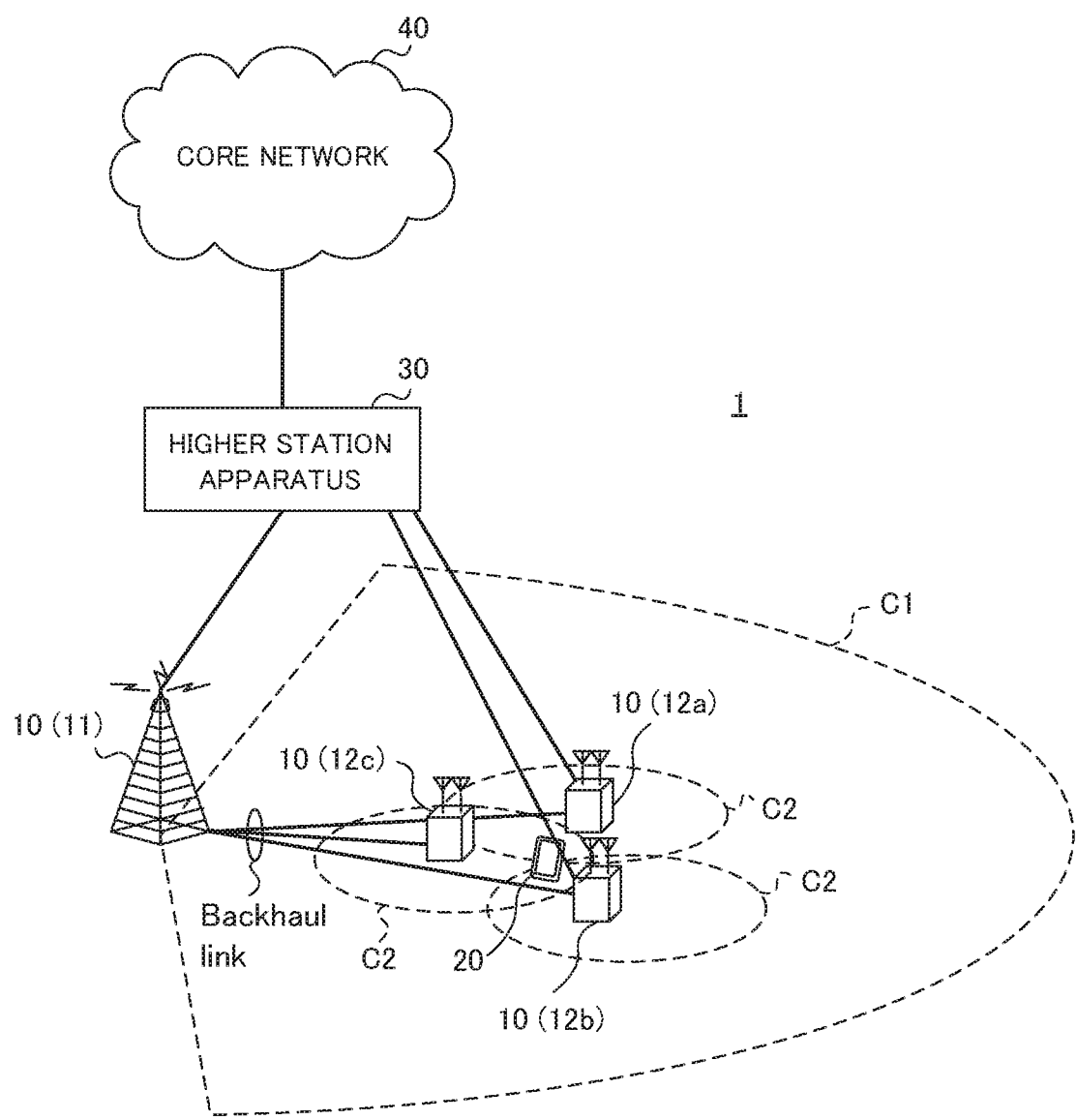
FIG. 8 is a diagram illustrating an example of a schematic configuration of a radio communication system of according to an embodiment of the present invention.

FIG. 8 shows an example of a schematic configuration of the radio communication system according to an embodiment of the present invention. The radio communication system 1 can apply carrier aggregation (CA) and/or dual connectivity (DC), in which a plurality of fundamental frequency blocks (component carriers) are aggregated, each component carrier as 1 unit being a system bandwidth of the LTE system (for example, 20 MHz). Note that this radio communication system may also be called SUPER 3G, LTE-A (LTE-Advanced), IMT-Advanced, 4G, 5G, or FRA (Future Radio Access), etc. In addition, in the radio communication system 1, TDD is adopted and UL and DL are changeable per TTI.

The radio communication system 1 shown in FIG. 8 includes a radio base station 11 which forms a macro cell C1, and radio base stations 12a through 12c provided within the macro cell C1 and each forming a small cell C2 that is smaller than the macro cell C1. Furthermore, a user terminal 20 is provided within the macro cell C1 and each small cell C2.

The user terminal 20 can connect both to the radio base station 11 and the radio base station 12. It is assumed that the user terminal 20 concurrently uses the macro cell C1 and the small cell C2 that use different frequencies via CA or DC. Furthermore, the user terminal 20 can apply CA or DC using a plurality of cells (CCs) (e.g., six or more CCs).

Communication between the user terminal 20 and the radio base station 11 can be carried out using a carrier (called an "existing carrier", "Legacy carrier", etc.) having a narrow bandwidth in a relatively low frequency band (e.g., 2 GHz). Whereas, communication between the user terminal 20 and the radio base station 12 may be carried out using a carrier having a wide bandwidth in a relative high frequency band (e.g., 3.5 GHz, 5 GHz, etc.), or using the same carrier as that with the radio base station 11. Note that the configuration of the frequency used by the radio base stations is not limited to the above.

A fixed-line connection (e.g., optical fiber, or X2 interface, etc., compliant with CPRI (Common Public Radio Interface)) or a wireless connection can be configured between the radio base station 11 and the radio base station 12 (or between two radio base stations 12).

The radio base station 11 and each radio base station 12 are connected to a higher station apparatus 30, and are connected to the core network 40 via the higher station apparatus 30. The higher station apparatus 30 includes, but is not limited to, an access gateway apparatus, a radio network controller (RNC), and a mobility management entity (MME), etc. Furthermore, each radio base station 12 may be connected to the higher station apparatus 30 via the radio base station 11.

Note that the radio base station 11 is a radio base station having a relatively wide coverage, and may be called a macro base station, an aggregation node, eNB (eNodeB) or a transmission/reception point. Furthermore, the radio base station 12 is a radio base station having a local coverage, and may be called a small base station, a micro base station, a pico base station, a femto base station, HeNB (Home eNodeB), RRH (Remote Radio Head), or a transmission/reception point, etc. Hereinafter, the radio base stations 11 and 12 will be generally referred to as "a radio base station 10" in the case where they are not distinguished from each other.

Each user terminal 20 is compatible with each kind of communication schemes such as LTE, LTE-A, etc., and also includes a fixed communication terminal in addition to a mobile communication terminal.

In the radio communication system 1, as radio access schemes, OFDMA (Orthogonal Frequency Division Multiple Access) is applied to the downlink (DL), and SC-FDMA (Single-Carrier Frequency Division Multiple Access) is applied to the uplink (UL). OFDMA is a multi-carrier transmission scheme for performing communication by dividing a frequency band into a plurality of narrow frequency bands (subcarriers) and mapping data to each subcarrier. SC-FDMA is a single carrier transmission scheme to reduce interference between terminals by dividing, per terminal, the system bandwidth into bands formed with one or continuous resource blocks, and allowing a plurality of terminals to use mutually different bands. The DL and UL radio access schemes are not limited to this combination and OFDM may be applied to UL. Otherwise, NOMA (non-orthogonal multiple access (also called "power multiple access").

In the radio communication system 1, used as downlink channels are a downlink data channel (PDSCH: Physical Downlink Shared Channel) that is shared by each user terminal 20, a broadcast channel (PBCH: Physical Broadcast channel), and an L1/L2 control channel (L1/L2 control signal), etc. PDSCH is used to transmit user data and higher layer control information, and an SIB (System Information Block). Furthermore, PBCH is used to an MIB (Master Information Block), etc.

The downlink L1/L2 control channel includes a downlink control channel (PDCCH (Physical Downlink Control Channel), an EPDCCH (Enhanced Physical Downlink Control Channel)), a PCFICH (Physical Control Format Indicator Channel), and a PHICH (Physical Hybrid-ARQ Indicator Channel), etc. PDCCH is used to transmit downlink control information (DCI), etc., which includes PDSCH and PUSCH scheduling information. PCFICH is used to transmit the number of OFDM symbols used in the PDCCH. PHICH is used to transmit a HARQ delivery acknowledgement signal (ACK/NACK) for the PUSCH. An EPDCCH that is frequency-division-multiplexed with a PDSCH (downlink shared data channel) can be used for transmitting the DCI in the same manner as the PDCCH.

In the radio communication system 1, used as uplink channels are an uplink shared channel (PUSCH: Physical Uplink Shared Channel) that is shared by each user terminal 20, an uplink control channel (PUCCH: Physical Uplink Control Channel), and a random access channel (PRACH: Physical Random Access Channel), etc. The PUSCH is used to transmit user data and higher layer control information. Uplink control information (UCI) including at least one of delivery acknowledgement information (HARQ-ACK) and radio quality information (CQI), etc., is transmitted via the PUSCH or the PUCCH. A random access preamble for establishing a connection with a cell is transmitted by the PRACH.

<Radio Base Station>

Figure 9:
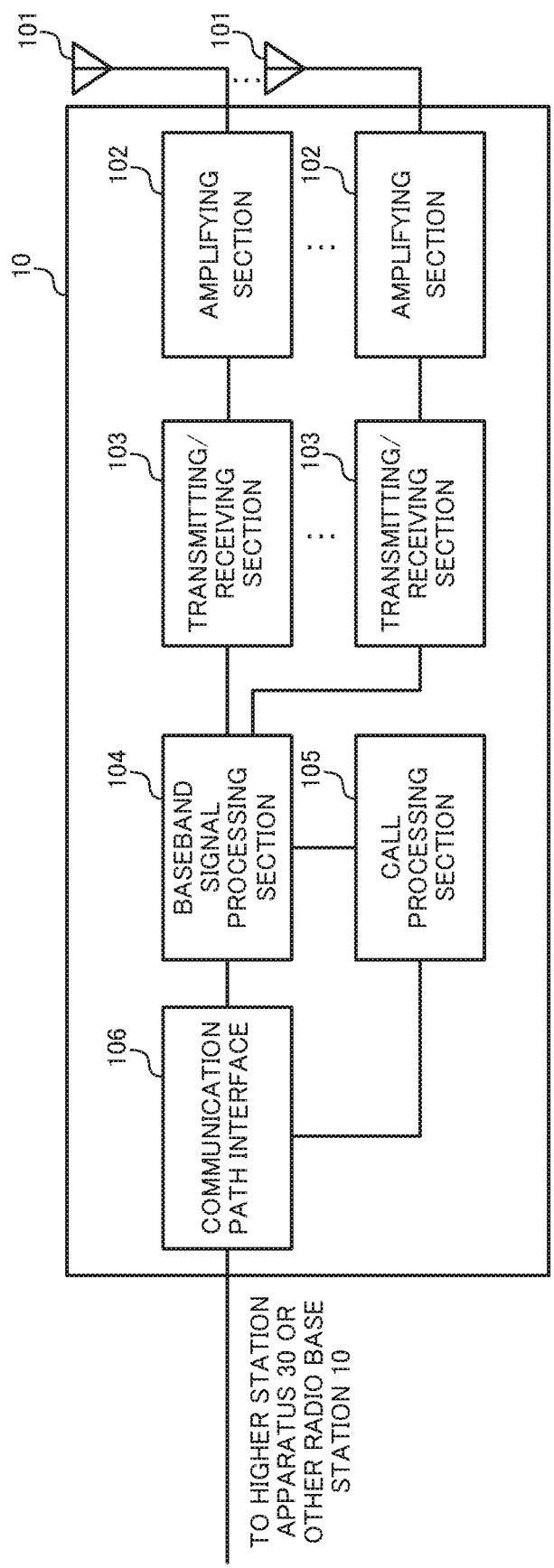
FIG. 9 is a diagram illustrating an overall configuration of a radio base station according to the illustrated embodiment.

FIG. 9 is a diagram illustrating an overall configuration of the radio base station according to the embodiment of the present invention. The radio base station 10 is configured of a plurality of transmission/reception antennas 101, amplifying sections 102, transmitting/receiving sections 103, a baseband signal processing section 104, a call processing section 105 and a transmission path interface 106. Note that the transmission/reception antennas 101, the amplifying sections 102 and the transmitting/receiving sections 103 may be configured to include one or more thereof, respectively.

User data that is to be transmitted on the downlink from the radio base station 10 to the user terminal 20 is input from the higher station apparatus 30, via the transmission path interface 106, into the baseband signal processing section 104.

In the baseband signal processing section 104, in regard to the user data, signals are subjected to PDCP (Packet Data Convergence Protocol) layer processing, RLC (Radio Link Control) layer transmission processing such as division and coupling of user data and RLC retransmission control transmission processing, MAC (Medium Access Control) retransmission control (e.g., HARQ (Hybrid Automatic Repeat reQuest) transmission processing), scheduling, transport format selection, channel coding, inverse fast Fourier transform (IFFT) processing, and precoding processing, and resultant signals are transferred to the transmission/reception sections 103. Furthermore, in regard to downlink control signals, transmission processing is performed, including channel coding and inverse fast Fourier transform, and resultant signals are also transferred to the transmission/reception sections 103.

Each transmitting/receiving section 103 converts the baseband signals, output from the baseband signal processing section 104 after being precoded per each antenna, to a radio frequency band and transmits this radio frequency band. The radio frequency signals that are subject to frequency conversion by the transmitting/receiving sections 103 are amplified by the amplifying sections 102, and are transmitted from the transmission/reception antennas 101.

The transmitting/receiving sections 103 may transmit information about a ratio (N) of UL TTI length and DL TTI length to the user terminal 20 by higher layer signaling or broadcast information. Furthermore, the transmitting/receiving sections 103 transmits downlink control information (for example, DL assignment, UL grant) to the user terminal 20 by the downlink control channel.

Based on common recognition in the field of the art pertaining to the present invention, each transmitting/receiving section 103 can correspond to a transmitter/receiver, a transmitter/receiver circuit or a transmitter/receiver device. Note that each transmitting/receiving section 103 may be configured as an integral transmitting/receiving section, or can be configured as a transmitting second and a receiving section.

Whereas, in regard to the uplink signals, radio frequency signals received by each transmission/reception antenna 101 are amplified by each amplifying section 102. The transmitting/receiving sections 103 receive the uplink signals that are amplified by the amplifying sections 102, respectively. The transmitting/receiving sections 103 frequency-convert the received signals into baseband signals and the converted signals are then output to the baseband signal processing section 104.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing on user data included in the input uplink signals. The signals are then transferred to the higher station apparatus 30 via the transmission path interface 106. The call processing section 105 performs call processing such as setting up and releasing a communication channel, manages the state of the radio base station 10, and manages the radio resources.

The transmission path interface 106 performs transmission and reception of signals with the higher station apparatus 30 via a predetermined interface. Furthermore, the transmission path interface 106 can perform transmission and reception of signals (backhaul signaling) with a neighboring radio base station 10 via an inter-base-station interface (for example, optical fiber or X2 interface compliant with CPRI (Common Public Radio Interface)).

Figure 10:
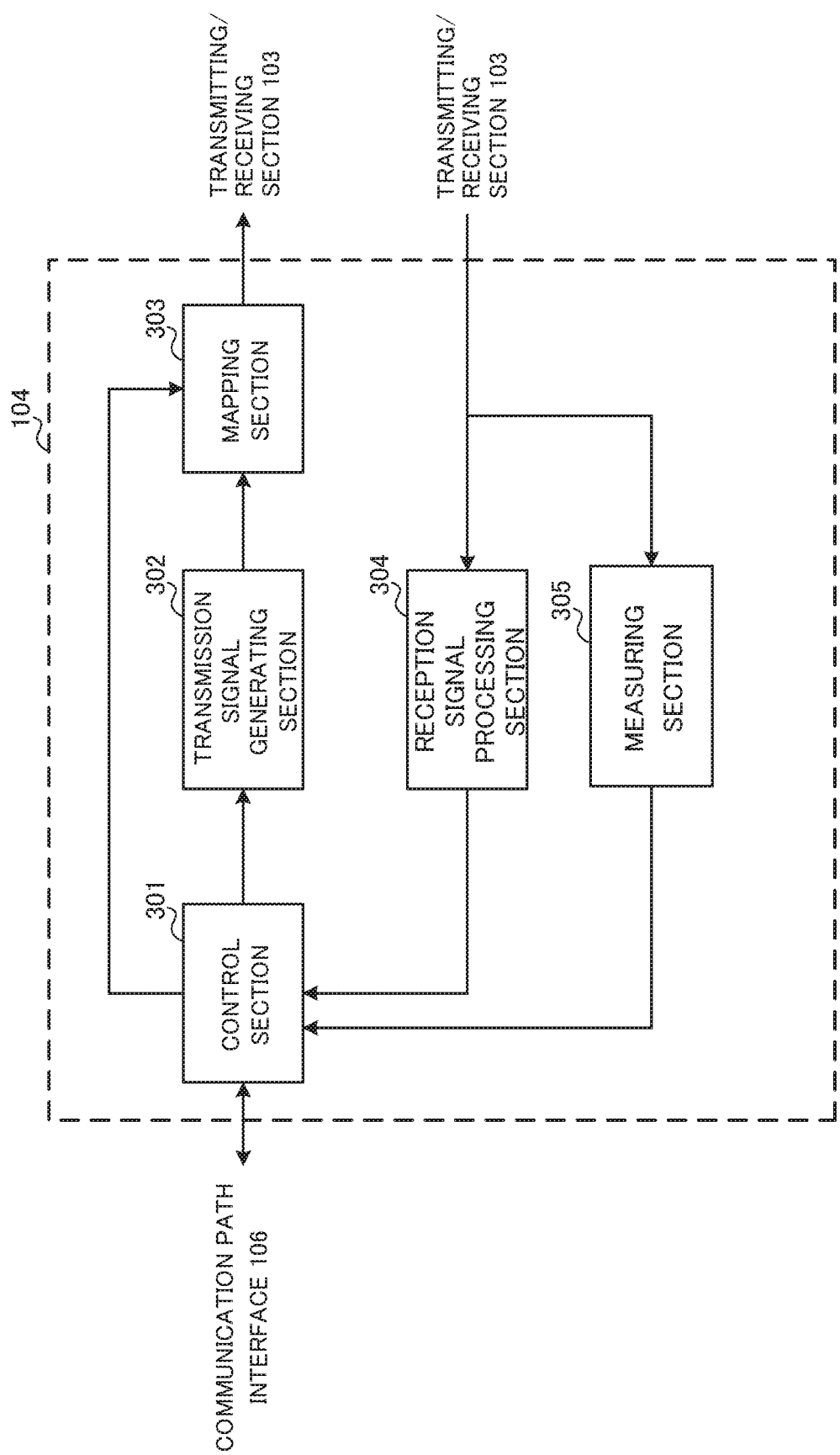
FIG. 10 is a diagram illustrating a functional configuration of the radio base station according to the illustrated embodiment.

FIG. 10 is a diagram illustrating the functional configurations of the radio base station according to the present embodiment. Note that although FIG. 10 mainly shows functional blocks of the features of the present embodiment, the radio base station 10 is also provided with other functional blocks that are necessary for carrying out radio communication. As illustrated in FIG. 10, the baseband signal processing section 104 includes a control section 301, a transmission signal generating section 302, a mapping section 303, a reception signal processing section 304, and a measuring section 305.

The control section 301 performs the control of the entire radio base station 10. The control section 301 controls, for example, the generation of the downlink signals via the transmission signal generating section 302, the mapping of signals via the mapping section 303, and the receiving process of signals via the reception signal processing section 304.

Specifically, the control section 301 controls switching between DL TTI and UL TTI. For example, the control section 301 may switch between DL TTI and UL TTI per TTI based on the traffic amount of DL and/or UL.

The control section may control to differentiate the DL TTI length from the UL TTI length (First Embodiment). For example, the control section may control the UL TTI length to be 1/N times (N is a positive integer) as long as the DL TTI length. Besides, the control section may differentiate the DL TTI length from the UL TTI length by changing the number of repetitions of the basic configuration. Further, the control section 301 may control the transmission signal generating section 302 to transmit information about a ratio of the UL TTI length and DL TTI length.

The control section 301 may control to change the DL TTI length and/or the UL TTI length dynamically and transmit DCI including information indicative of the changed TTI length. When the DL TTI and/or UL TTI is configured by repetition of the basic configuration, the control section 301 may control may transmit DCI including information that indicates the number of repetitions of the basic configuration.

In addition, the control section 301 may control the transmission signal generating section 302 and the mapping section 303 to include a preamble symbol to allocate a preamble in DL TTI (Second Embodiment). Further, the control section 301 may control to include a plurality of preamble symbols in DL TTI.

Further, the control section 301 may control the transmission signal generating section 302 and the mapping section 302 to make the preamble symbol different from a symbol to which the downlink data channel and/or downlink control channel is allocated in at least any of the symbol length, subcarrier spacing and CP length.

Furthermore, the control section 301 controls allocation of radio resources to the downlink data channel and the uplink data channel (scheduling). The control section 301 controls to include, in the downlink control channel transmission, the DCI to instruct UL transmission or DL reception in the allocated radio resource.

Yet furthermore, the control section 301 may control to transmit, in the downlink control channel, DCI (for example, DL assignment) indicating both of an allocation resource of a downlink data channel and an allocation resource of a feedback signal for the downlink data channel (Third Embodiment). In addition, the control section 301 may determine the allocation resource of the feedback signal based on capability information (for example, interval information as mentioned above) from the user terminal 20.

The control section 301 may control retransmission of a DL signal based on information (for example, transmission acknowledgement information) fed back in the feedback symbol of the DL TTI (Third Embodiment).

Based on common recognition in the field of the art pertaining to the present invention, the control section 301 can correspond to a controller, a control circuit or a control device.

The transmission signal generating section 302 generates a DL signal (including downlink data channel, downlink control channel (L1 control signal), downlink reference signal) based on instructions from the control section 301, and outputs the generated signal to the mapping section 303.

Specifically, the transmission signal generating section 302 generates a preamble to be mapped to a preamble symbol, based on the instruction from the control section 301 and outputs the preamble to the mapping section 303. Here, the preamble is a sequence already known to the user terminal 20 and the radio base station 10 and may be any of cell-specific, transmission point-specific and beam pattern-specific sequence.

For example, the transmission signal generating section 302 may generate a preamble based on any of the cell ID, virtual cell ID and beam pattern identification information. Note that information to use in generation of the preamble (for example, cell ID, virtual cell ID or beam pattern identification information) may be provided to the user terminal 20 by higher layer signaling.

Based on common recognition in the field of the art pertaining to the present invention, the transmission signal generating section 302 can correspond to a signal generator, a signal generating circuit or a signal generating device.

Based on instructions from the control section 301, the mapping section 303 maps the DL signal generated in the transmission signal generating section 302 to predetermined radio resources to output to the transmitting/receiving sections 103.

Specifically, based on the instructions from the control section 301, the mapping section 303 maps the DL signal generated in the transmission signal generating section 302 to a preamble symbol and output it to the transmitting/receiving sections 103.

Based on common recognition in the field of the art pertaining to the present invention, the mapping section 303 can correspond to a mapper, a mapping circuit and a mapping device.

The reception signal processing section 304 performs a receiving process (e.g., demapping, demodulation, and decoding, etc.) on the UL signal (including an uplink data channel, an uplink control channel and an uplink reference signal) transmitted from the user terminal 20. The result of this process is output to the control section 301.

Based on common recognition in the field of the art pertaining to the present invention, the reception signal processing section 304 can correspond to a signal processor, a signal processing circuit, or a signal processing device; or can be configured as a measurer, a measuring circuit or a measuring device.

The measuring section 305 performs measurement using an uplink reference signal from the user terminal 20 and outputs a measurement result to the control section 301. Based on common recognition in the field of the art pertaining to the present invention, the measuring section 305 can correspond to a signal processor, a signal processing circuit, or a signal processing device; or can be configured as a measurer, a measuring circuit or a measuring device.

<User Terminal>

Figure 11:
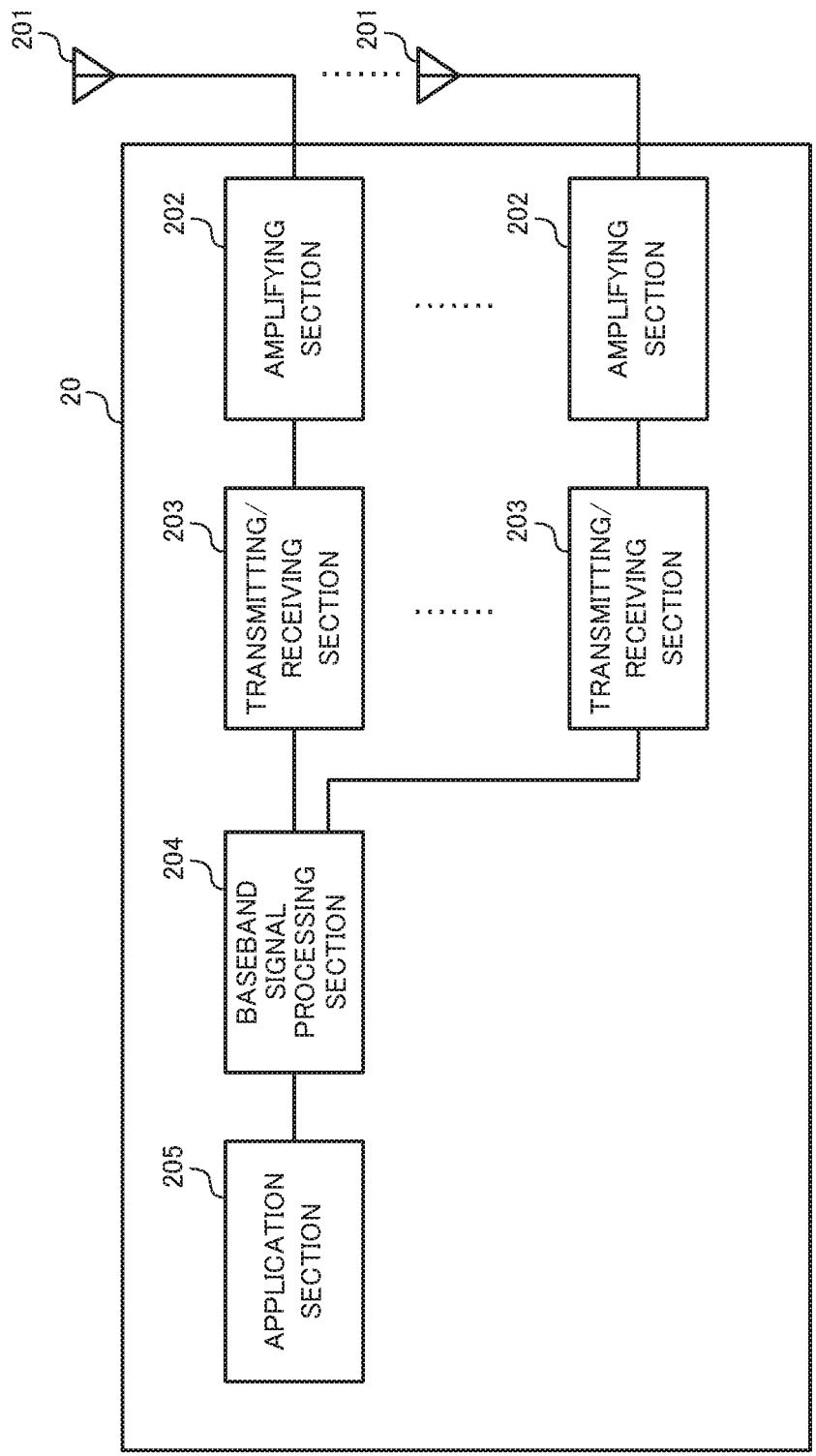
FIG. 11 is a diagram illustrating an overall configuration of a user terminal according to the illustrated embodiment.

FIG. 11 is a diagram showing an overall structure of a user terminal according to an embodiment of the present invention. The user terminal 20 is provided with a plurality of transmitting/receiving antennas 201 for MIMO communication, amplifying sections 202, transmitting/receiving sections 203, a baseband signal processing section 204 and an application section 205.

Radio frequency signals that are received in the plurality of transmitting/receiving antennas 201 are respectively amplified in the amplifying sections 202. Each transmitting/receiving section 203 receives a downlink signal that has been amplified by an associated amplifying section 202. The transmitting/receiving sections 203 perform frequency conversion on the reception signals to convert into baseband signals, which signals are thereafter output to the baseband signal processing section 204.

The input baseband signal is subjected to an FFT process, error correction decoding, a retransmission control receiving process, etc., in the baseband signal processing section 204. The downlink user data is forwarded to the application section 205. The application section 205 performs processes related to higher layers above the physical layer and the MAC layer. Furthermore, out of the downlink data, broadcast information is also forwarded to the application section 205.

On the other hand, uplink user data is input to the baseband signal processing section 204 from the application section 205. In the baseband signal processing section 204, a retransmission control transmission process (e.g., a HARQ transmission process), channel coding, precoding, a discrete fourier transform (DFT) process, an inverse fast fourier transform (IFFT) process, etc., are performed, and the result is forwarded to each transmitting/receiving section 203. The baseband signal that is output from the baseband signal processing section 204 is converted into a radio frequency band in the transmitting/receiving sections 203. Thereafter, the amplifying sections 202 amplify the radio frequency signal having been subjected to frequency conversion, and transmit the resulting signal from the transmitting/receiving antennas 201.

Note that the transmitting/receiving sections 203 receives information about a ratio (N) between UL TTI length and DL TTI length from the radio base station 10 by higher layer signaling or broadcast information. In addition, the transmitting/receiving sections 203 may receive downlink control information (for example, UL grant or DL assignment) from the radio base station 10 by the downlink control channel.

Based on common recognition in the field of the art pertaining to the present invention, each transmitting/receiving section 203 can correspond to a transmitter/receiver, a transmitter/receiver circuit or a transmitter/receiver device. Furthermore, each transmitting/receiving section 203 may be configured of an integral transmitting/receiving section, or configured as a transmitting section and a receiving section.

Figure 12:
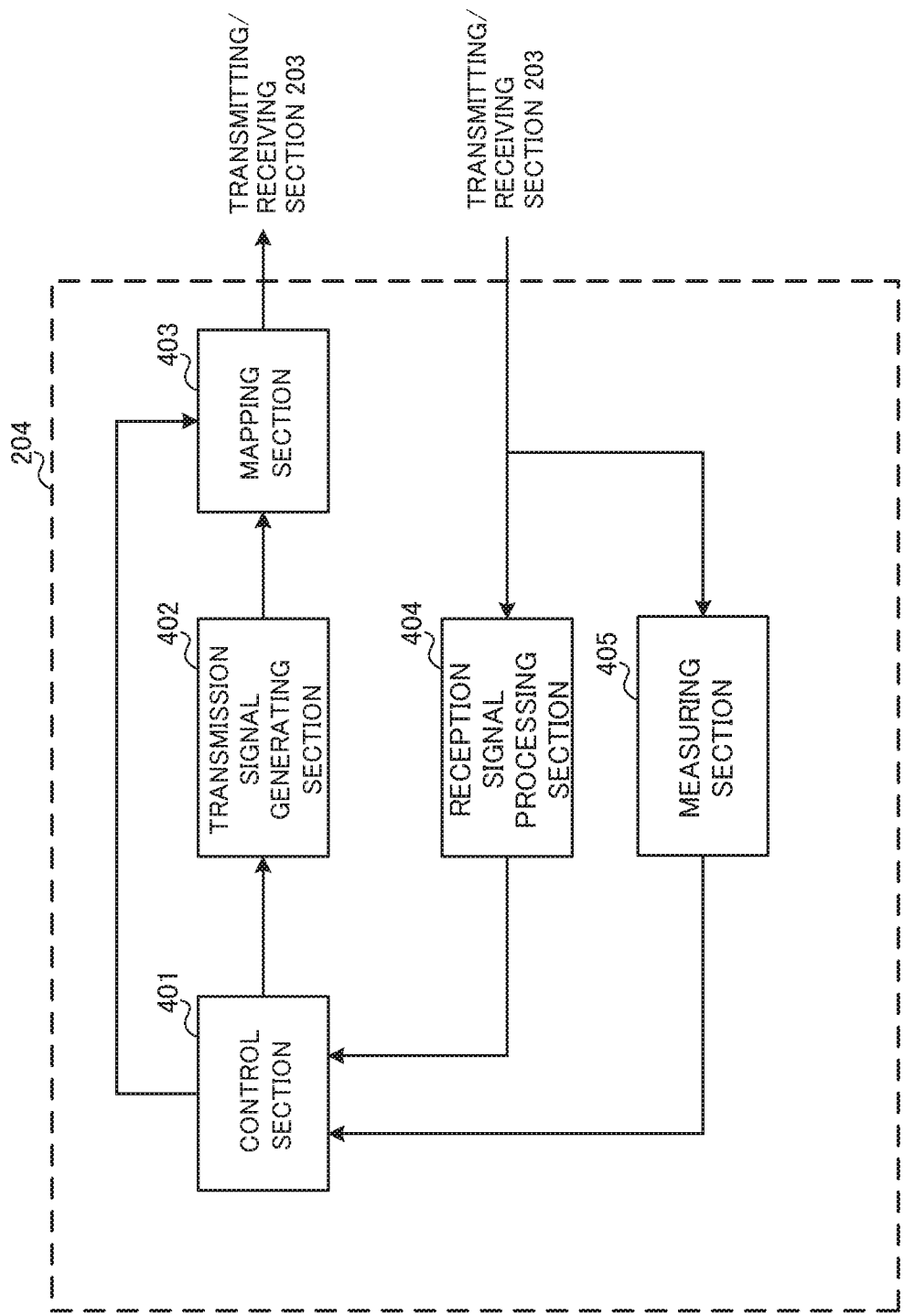
FIG. 12 is a diagram illustrating a functional configuration of the user terminal according to the illustrated embodiment.

FIG. 12 is a diagram illustrating the functional configurations of the user terminal according to the present embodiment. Note that FIG. 12 mainly shows functional blocks of the features of the present embodiment, and the user terminal 20 is also provided with other functional blocks that are necessary for carrying out radio communication. As illustrated in FIG. 12, the baseband signal processing section 204 provided in the user terminal 20 includes a control section 401, a transmission signal generating section 402, a mapping section 403, a reception signal processing section 404, and a measuring section 405.

The control section 401 carries out the control of the entire user terminal 20. The control section 401 controls, e.g., the signal generation performed by the transmission signal generating section 402, the signal mapping performed by the mapping section 403, and the signal reception processes performed by the reception signal processing section 404.

Further, the control section controls UL signal transmission in the UL TTI and DL signal reception in the DL TTI. Here, the control section 401 applies different TTI lengths to the DL TTI and UL TTI (First Embodiment). In addition, the control section controls the UL TTI length to be 1/N times as long as the DL TTI length (N is a positive integer). The control section 401 may control DL signal reception in the DL TTI and UL signal transmission in the UL TTI based on information about a ratio (for example, N) between the DL TTI length and the UL TTI length. This information about the ratio may be provided from the radio base station 10 to the user terminal 20.

Furthermore, the control section 401 may control to change the DL TTI length and/or UL TTI length dynamically. Specifically, the control section 401 may control DL signal reception in the DL TTI and UL signal transmission in the UL TTI based on TTI indicated by DCI. Besides, when DL TTI and/or UL TTI is configured by repetition of the basis configuration, the control section 401 may control the DL reception in the DL TTI and the UL signal transmission in the UL TTI based on the number of repetitions indicated by DCI.

In addition, the control section 401 determines whether each TTI is DL TTI (TTI for DL) or not based on the TTI signal configuration and controls reception of a DL signal. Besides, the control section 401 may determine whether the TTI is DL TTI or not in accordance with presence or absence of a preamble detected in each TTI.

For example, when the preamble is detected in TTI, the control section may determine that TTI is DL TTI. In this case, the control section 401 may control to perform at least one of time frequency synchronization, AGC (Automatic Gain Control), channel estimation and demodulation of a control channel by using a reference signal included in the DL TTI.

Or, when the preamble is not detected in TTI, the control section 401 may determine that the TTI is UL TTI. In this case, the control section 401 may control not to perform the above-mentioned processes that are performed when it is determined that the TTI is DL TTI.

In addition, the control section 401 may control the timing of determining whether each TTI is DL TTI or not based on the TTI length (Second Embodiment)

Further, the control section 401 may control to transmit a feedback signal in response to a DL signal received in the DL TTI, by using a feedback symbol for the DL TTI or a feedback symbol for next or later DL TTI (Third Embodiment).

The control section 401 may determine a feedback symbol based on downlink control information indicating both of a DL signal allocation resource and a feedback signal allocation resource or based on downlink control information indicating the DL signal allocation resource and capability information of the user terminal 20 or information given by higher layer signaling and may transmit a feedback signal in the feedback symbol (Third Embodiment).

Based on common recognition in the field of the art pertaining to the present invention, the control section 401 can correspond to a controller, a control circuit or a control device.

The transmission signal generating section 402 generates UL signals (including an uplink data signal, an uplink control signal and an uplink reference signal, etc.) based on instructions from the control section 401, and outputs these UL signals to the mapping section 403. For example, the transmission signal generating section 402 generates an uplink control signal (PUCCH) including a UCI. In addition, the transmission signal generating section 402 generates an uplink data channel including uplink user data.

Based on common recognition in the field of the art pertaining to the present invention, the transmission signal generating section 402 can correspond to a signal generator, a signal generating circuit, or a signal generating device.

The mapping section 403 maps the UL signal (uplink control signal, uplink data signal, uplink reference signal, etc.) generated by the transmission signal generating section 402, based on instructions from the control section 401, to radio resources and outputs the generated signal to the transmitting/receiving sections 203. Based on common recognition in the field of the art pertaining to the present invention, the mapping section 403 can correspond to a mapper, a mapping circuit or a mapping device.

The reception signal processing section 404 performs reception processing (e.g., demapping, demodulation, decoding, etc.) on the DL signal (including a downlink control channel (UL control signal) and a downlink data channel). The reception signal processing section 404 outputs the information received from the radio base station 10 to the control section 401. The reception signal processing section 404 outputs, for example, broadcast information, system information, control information by higher layer signaling such as RRC signaling, and DCI, etc. to the control section 401.

Based on common recognition in the field of the art pertaining to the present invention, the reception signal processing section 404 can correspond to a signal processor, a signal processing circuit, or a signal processing device. Furthermore, the reception signal processing section 404 can be configured as a receiving section pertaining to the present invention.

The measuring section 405 measures (estimates) a channel state based on a downlink reference signal (for example, CRS, CSI-RS) from the radio base station 10 and outputs a measurement result to the control section 401. The measuring section 405 may estimate the channel state based on a preamble allocated to a preamble symbol in the TTI.

Based on common recognition in the field of the art pertaining to the present invention, the measuring section 405 can correspond to a signal processor, a signal processing circuit, or a signal processing device; or can be configured as a measurer, a measuring circuit or a measuring device.

Furthermore, the block diagrams used in the above description of the present embodiment indicate function-based blocks. These functional blocks (configured sections) are implemented via a combination of hardware and software. Furthermore, the implementation of each functional block is not limited to a particular means. In other words, each functional block may be implemented by a single device that is physically connected, or implemented by two or more separate devices connected by a fixed line or wirelessly connected.

For example, some or all of the functions of the radio base station 10 and the user terminal 20 may be implemented by using hardware such as ASICs (Application Specific Integrated Circuits), PLDs (Programmable Logic Devices) and FPGAs (Field Programmable Gate Arrays), etc. Furthermore, the radio base station 10 and the user terminal 20 may be each implemented by a computer device that includes a processor (CPU: Central Processing Unit), a communication interface for connecting to a network, a memory and a computer-readable storage medium that stores a program(s). In other words, the radio base station and the user terminal, etc., pertaining to the embodiment of the present invention may function as a computer that performs processes of the radio communication method pertaining to the present invention.

The processor and memory, etc., are connected to buses for communication of information. Furthermore, the computer-readable storage medium includes, e.g., a flexible disk, a magnetic-optical disk, ROM (Read Only Memory), EPROM (Erasable Programmable ROM), CD-ROM (Compact Disc-ROM), RAM (Random Access Memory), or a hard disk, etc. Furthermore, a program may be transmitted from a network via electric telecommunication lines. Furthermore, the radio base station 10 and the user terminal 20 may also include an input device such as input keys, and an output device such as a display.

The functional configurations of the radio base station 10 and the user terminal 20 may be implemented using the above-mentioned hardware, may be implemented using software modules that are run by a processor, or may be implemented using a combination of both thereof. The processor controls the entire user terminal by operating an operating system. Furthermore, the processor reads programs, software modules and data from the storage medium into a memory, and performs the various processes thereof accordingly.

The above-mentioned program only needs to be a program that can perform the operations described in the above embodiment on a computer. For example, the control section 401 of the user terminal 20 may be stored in the memory, and implemented by the processor operating a control program, and the other above-mentioned functional blocks can also be implemented in the same manner.

Furthermore, software and commands, etc., may be transmitted/received via a transmission medium. For example, in the case where software is transmitted from a website, server or other remote source by using fixed-line technology, such as coaxial cable, optical fiber cable, twisted-pair wire and digital subscriber's line (DSL), etc., and/or wireless technology, such as infrared, radio and microwaves, etc., such fixed-line technology and wireless technology are included within the definition of a transmission medium.

Note that technical terms discussed in the present specification and/or technical terms necessary for understanding the present specification may be replaced with technical terms having the same or similar meaning. For example, channel and/or symbol may be signals (signaling). Furthermore, a signal may be a message. Furthermore, component carrier (CC) may be called a carrier frequency or cell, etc.

Furthermore, information and parameters, etc., discussed in the present specification may be expressed as absolute values, or as a relative value with respect to a predetermined value, or expressed as other corresponding information. For example, a radio resource may be indicated as an index.

Information and signals, etc., discussed in the present specification may be expressed using any one of various different technologies. For example, data, instructions, commands, information, signals, bits, symbols, chips, etc., that could be referred to throughout the above description may be expressed as voltage, current, electromagnetic waves, a magnetic field or magnetic particles, optical field or photons, or a desired combination thereof.

The above-described aspects/embodiments of the present invention may be used independently, used in combination, or may be used by switching therebetween when being implemented. Furthermore, notification of predetermined information (e.g., notification of "is X") does not need to be explicit, but may be implicitly (e.g., by not notifying the predetermined information) carried out.

Notification of information is not limited to the aspects/embodiments of the present invention, such notification may be carried out via a different method. For example, notification of information may be implemented by physical layer signaling (e.g., DCI (Downlink Control Information), UCI (Uplink Control Information)), higher layer signaling (e.g., RRC (Radio Resource Control) signaling, MAC (Medium Access Control) signaling, broadcast information (MIB (Master Information Block), SIB (System Information Block))), by other signals or a combination thereof. Furthermore, RRC signaling may be called a "RRC message" and may be, e.g., an RRC connection setup (RRCConnectionSetup) message, or an RRC connection reconfiguration (RRCConnectionReconfiguration) message, etc.

The above-described aspects/embodiments of the present invention may be applied to a system that utilizes LTE (Long Term Evolution), LTE-A (LTE-Advanced), SUPER 3G, IMT-Advanced, 4G, 5G, FRA (Future Radio Access), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other suitable systems and/or to an enhanced next-generation system that is based on any of these systems.

The order of processes, sequences and flowcharts, etc., in the above-described aspects/embodiments of the present invention can have a switched order so long as no contradictions occur. For example, each method described in the present specification proposes an example of an order of various steps but are not limited to the specified order thereof.

Up to this point, the present invention has been described in detail, however, it would be apparent for a person of ordinary skill in the art that the present invention is not limited to the embodiments described herein. The present invention can be embodied in various modified or altered forms without departing from the sprit or scope of the present invention defined by claims. Accordingly, the description is given only for illustrative purposes and is by no means intended to limit the present invention.

The invention claimed is:

1. A terminal comprising:
a receiver that receives first downlink control information used for scheduling a physical downlink shared channel (PDSCH) and second downlink control information used for scheduling a physical uplink shared channel (PUSCH); and
a processor that determines a length of a symbol section that is allocated to the PDSCH by using first information, included in the first downlink control information, regarding a resource to be allocated, and determines a length of symbol section that is allocated to the PUSCH by using second information, included in the second downlink control information, regarding a resource to be allocated,
wherein the length of the symbol section that is allocated to the PDSCH is different from the length of the symbol section that is allocated to the PUSCH.

2. The terminal according to claim 1, wherein the processor determines feedback timing of delivery acknowledgement information for the PDSCH, based on the first downlink control information.

3. A radio communication method for a terminal, comprising:
receiving first downlink control information used for scheduling a physical downlink shared channel (PDSCH) and second downlink control information used for scheduling a physical uplink shared channel (PUSCH); and
determining a length of a symbol section that is allocated to the PDSCH by using first information, included in the first downlink control information, regarding a resource to be allocated, and determining a length of symbol section that is allocated to the PUSCH by using second information, included in the second downlink control information, regarding a resource to be allocated,
wherein the length of the symbol section that is allocated to the PDSCH is different from the length of the symbol section that is allocated to the PUSCH.

4. A base station comprising:
a transmitter that transmits first downlink control information used for scheduling a physical downlink shared channel (PDSCH) and second downlink control information used for scheduling a physical uplink shared channel (PUSCH); and
a processor that indicates a length of a symbol section that is allocated to the PDSCH by using first information, included in the first downlink control information, regarding a resource to be allocated, and indicates a length of symbol section that is allocated to the PUSCH by using second information, included in the second downlink control information, regarding a resource to be allocated,
wherein the length of the symbol section that is allocated to the PDSCH is different from the length of the symbol section that is allocated to the PUSCH.

5. A system comprising a base station and a terminal, wherein;
the base station comprises:
a transmitter that transmits first downlink control information used for scheduling a physical downlink shared channel (PDSCH) and second downlink control information used for scheduling a physical uplink shared channel (PUSCH); and
a first processor that indicates a length of a symbol section that is allocated to the PDSCH by using first information, included in the first downlink control information, regarding a resource to be allocated, and indicates a length of symbol section that is allocated to the PUSCH by using second information, included in the second downlink control information, regarding a resource to be allocated; and
the terminal comprises:
a receiver that receives the first downlink control information and second downlink control information; and
a second processor that determines the length of the symbol section that is allocated to the PDSCH by using first information, and determines the length of symbol section that is allocated to the PUSCH by using second information,
wherein the length of the symbol section that is allocated to the PDSCH is different from the length of the symbol section that is allocated to the PUSCH.

* * * * *